Dec. 6, 1932.  A. KROKENBERGER  1,890,389
FOOT LIFT FOR TRACTOR PLOWS
Filed July 26, 1932
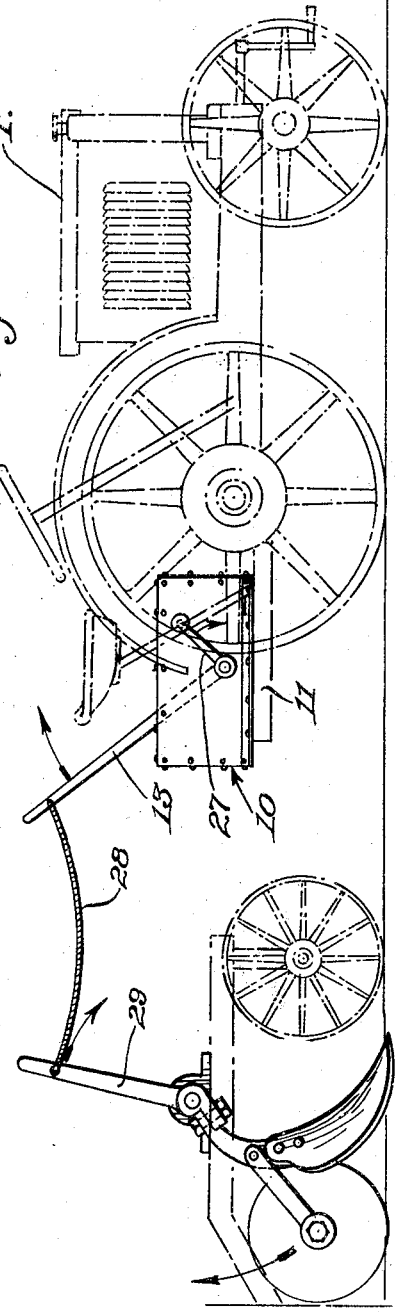
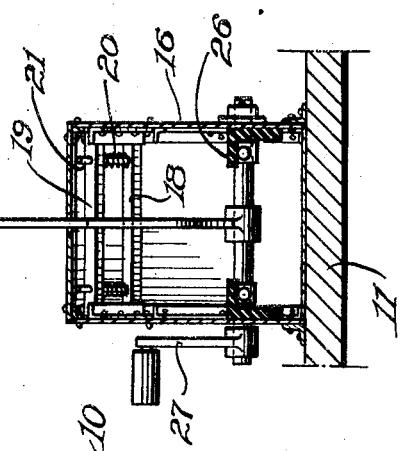
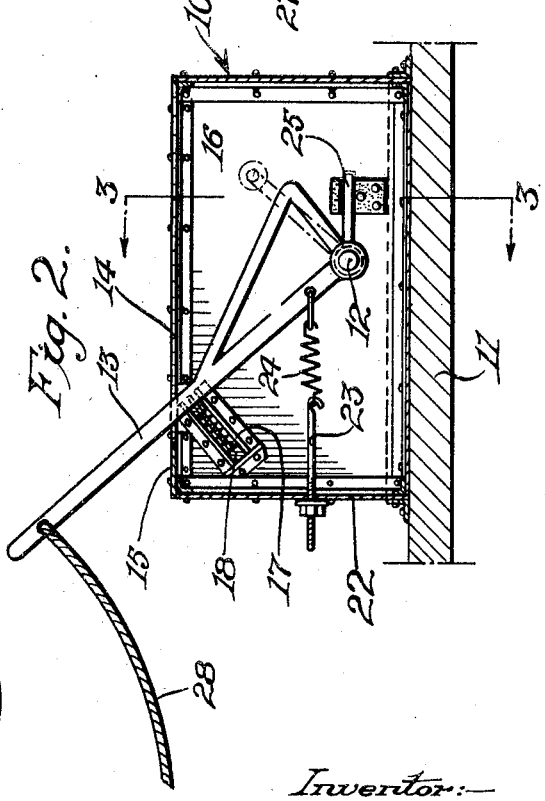
Inventor:—
Adolph Krokenberger
by his Attorneys
Howson & Howson Patented Dec. 6, 1932

1,890,389

UNITED STATES PATENT OFFICE

ADOLPH KROKENBERGER, OF PAULSBORO, NEW JERSEY

FOOT LIFT FOR TRACTOR PLOWS

Application filed July 26, 1932. Serial No. 624,882.

This invention relates to foot lifts for plows and more particularly to an apparatus for use on a tractor in operating a lift on a trailer plow.

An important object of the invention is the provision of a structure of this character which may be very readily attached to the tractor and which will afford an easily operable means for actuating the plow lift without the operator of the tractor removing his hands from the steering controls.

A further object of the invention is to provide in an apparatus of this character an arrangement eliminating the "kick" ordinarily resulting from the jerk upon the apparatus when the actuating lever is released.

A still further object of the invention is the provision of an apparatus of this character which will be durable and efficient in operation and which may be cheaply manufactured.

These and other objects I attain by the construction in the accompanying drawing, wherein:

Fig. 1 illustrates a foot lift constructed in accordance with my invention as applied to a tractor and connected to a trailer plow;

Fig. 2 is a longitudinal sectional view through the plow lift; and

Fig. 3 is a section on the line 3—3 of Fig. 2.

Referring now more particularly to the drawing, the numeral 10 generally designates a casing adapted to be secured upon the platform 11 of a tractor T. The casing has directed through and rotatably mounted in its side walls a shaft 12, which shaft has secured thereto a securely braced arm 13 projecting upwardly through the shaft and through a slot 14 in the upper wall 15 of the casing. Adjacent the rear end of the slot but slightly in advance thereof the side walls 16 of this casing have secured into their inner faces channel guides 17 mounting stationary and movable plates 18 and 19. The guides are inclined at such angle that they are perpendicular to the lever when the lever is in alignment with the upper ends of the guides and between the plates 18 and 19 springs 20 are disposed for the purpose of yieldingly urging these plates apart. In the present instance these springs are shown as mounted about pins 21 secured in the stationary plate and slidably directed through the movable plate. The rear wall 22 of the casing has adjustably directed therethrough a member 23, the inner end of which is connected to the rear end of a spring 24 which has its forward end connected to the lever 13. Shaft 12 has forwardly projecting arms 25 arranged adjacent the side walls 16 of the casing and secured to the side walls are brackets embodying portions 26 overhanging the arms 25. Exteriorly of the casing one end of the shaft has a pedal lever 27 secured thereto.

In using the apparatus the upper end of the arm 13 is connected to a flexible element 28 or other suitable means through the operating lever 29 of the lift plow. When it is desired to operate the plow pressure is applied to the pedal lever 27, pressing the arm 13 forwardly. When the change in position of the plow has been effected, the foot is removed from the pedal lever or the pressure applied to the foot released when the spring 24 will throw the arm 13 rearwardly. As the arm nears the rearward limit of its movement it will engage against the movable plate 19 and the springs 20 will act to check the movement thereof so that the actual engagement of the arms 25 with the stop will be very light. By regulating the tension of spring 24 the speed of movement of the arm 13 may be very closely regulated.

It will be obvious that apparatus of this character may be readily and cheaply manufactured and readily applied to a tractor.

I claim:

1. In a foot-control mechanism for operating the plow lift of a trailer plow on a tractor, an arm pivotally supported from the tractor frame, a pedal lever to rotate said arm in one direction, a spring to move the arm in the opposite direction, means to yieldably check movement of the arm in the last-named direction, and means to positively limit movement of the arm in the last-named direction.

2. In a foot-control mechanism for operating the plow lift of a trailer plow on a tractor, an arm pivotally supported from the tractor frame, a pedal lever to rotate said arm in one direction, a spring to move the arm in the opposite direction, means to yieldably check movement of the arm in the last-named direction, means to positively limit movement of the arm in the last-named direction, and means to adjustably regulate the tension of said spring.

3. In foot-operated means for controlling the lifts of tractor plows from tractors or the like, a casing adapted to be secured to the tractor frame and having a slot in the upper wall thereof, a shaft pivoted in the casing, an arm secured to said shaft, a pedal lever likewise secured to said shaft and adapted to move the arm in one direction, a spring to move the arm in the opposite direction, and means to yieldably limit the movement of the arm in the last-named direction.

4. In foot-operated means for controlling the lifts of tractor plows from tractors or the like, a casing adapted to be secured to the tractor frame and having a slot in the upper wall thereof, a shaft pivoted in the casing, an arm secured to said shaft, a pedal lever likewise secured to said shaft and adapted to move the arm in one direction, a spring to move the arm in the opposite direction, and means to yieldably limit the movement of the arm in the last-named direction, comprising a yieldably mounted plate against which the arm engages as it nears the rear end of the slot.

5. In foot-operated means for controlling the lifts of tractor plows from tractors or the like, a casing adapted to be secured to the tractor frame and having a slot in the upper wall thereof, a shaft pivoted in the casing, an arm secured to said shaft, a pedal lever likewise secured to said shaft and adapted to move the arm in one direction, a spring to move the arm in the opposite direction, means to yieldably limit the movement of the arm in the last-named direction, a relatively short arm likewise secured to said shaft, and a fixed stop carried by the casing.

6. In foot-operated means for controlling the lifts of tractor plows from tractors or the like, a casing adapted to be secured to the tractor frame and having a slot in the upper wall thereof, a shaft pivoted in the casing, an arm secured to said shaft, a pedal lever likewise secured to said shaft and adapted to move the arm in one direction, a spring to move the arm in the opposite direction, and means to yieldably limit the movement of the arm in the last-named direction, said spring being connected between said arm and a member adjustably mounted through the rear wall of said casing.

7. In foot-operated means for controlling the lifts of tractor plows from tractors or the like, a casing adapted to be secured to the tractor frame and having a slot in the upper wall thereof, a shaft pivoted in the casing, an arm secured to said shaft, a pedal lever likewise secured to said shaft and adapted to move the arm in one direction, a spring to move the arm in the opposite direction, means to yieldably limit the movement of the arm in the last-named direction, said yieldable means comprising channel guides secured to the inner faces of the side walls of the casing, a pair of plates having their ends mounted in said guides, and springs extending between said plates, said guides being substantially perpendicularly related to the arm when the movable plate is engaged by said arm.

8. In foot-operated means for controlling the lifts of tractor plows from tractors or the like, a casing adapted to be secured to the tractor frame and having a slot in the upper wall thereof, a shaft pivoted in the casing, an arm secured to said shaft and adapted to move the arm in one direction, a spring to move the arm in the opposite direction, means to yieldably limit the movement of the arm in the last-named direction, said yieldable means comprising channel guides secured to the inner faces of the side walls of the casing, a pair of plates having their ends mounted in said guides, and springs extending between said plates, said guides being substantially perpendicularly related to the arm when the movable plate is engaged by said arm, the first-named spring being connected between said arm and a member adjustably connected through the rear wall of the casing.

ADOLPH KROKENBERGER.